United States Patent
Peckham

(10) Patent No.: US 9,529,585 B2
(45) Date of Patent: *Dec. 27, 2016

(54) DYNAMIC LIBRARY REPLACEMENT

(71) Applicant: International Business Machines Corporation, Armonk, NY (US)

(72) Inventor: Stephen B. Peckham, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 81 days.

This patent is subject to a terminal disclaimer.

(21) Appl. No.: 14/097,510

(22) Filed: Dec. 5, 2013

(65) Prior Publication Data

US 2014/0282568 A1    Sep. 18, 2014

Related U.S. Application Data

(63) Continuation of application No. 13/844,673, filed on Mar. 15, 2013.

(51) Int. Cl.
  *G06F 9/44*    (2006.01)
  *G06F 9/445*   (2006.01)
  *G06F 9/46*    (2006.01)
  *G06F 9/48*    (2006.01)

(52) U.S. Cl.
  CPC . *G06F 8/67* (2013.01); *G06F 9/46* (2013.01); *G06F 9/485* (2013.01)

(58) Field of Classification Search
  None
  See application file for complete search history.

(56) References Cited

U.S. PATENT DOCUMENTS

| | | | | |
|---|---|---|---|---|
| 6,105,049 | A * | 8/2000 | Govindaraju | G06F 9/3004 712/E9.032 |
| 6,349,322 | B1 * | 2/2002 | Shaylor | 718/107 |
| 7,289,998 | B2 * | 10/2007 | Kalos | |
| 7,290,145 | B2 | 10/2007 | Falkenthros | |
| 7,536,683 | B2 * | 5/2009 | Zimmerman | G06F 9/44521 717/162 |
| 7,594,234 | B1 * | 9/2009 | Dice | 718/108 |
| 8,082,551 | B2 * | 12/2011 | Ibrahim et al. | 718/108 |
| 8,103,815 | B2 | 1/2012 | Ganguly | |
| 8,321,849 | B2 | 11/2012 | Nickolls et al. | |
| 2011/0078676 | A1 * | 3/2011 | Sutherland | G06F 9/54 717/173 |
| 2011/0202903 | A1 * | 8/2011 | Lee et al. | 717/128 |
| 2012/0117658 | A1 * | 5/2012 | Haga et al. | 726/26 |

* cited by examiner

*Primary Examiner* — Evral E Bodden
(74) *Attorney, Agent, or Firm* — Thomas E. Tyson; Gregory K. Goshorn; Greg Goshorn, P.C.

(57) ABSTRACT

Provided are techniques for an OS to be modified on a running system such that running programs, including system services, so not have to be stopped and restarted for the modification to take effect. The techniques include detecting, by a processing thread, when the processing thread has entered a shared library; in response to the detecting, setting a thread flag corresponding to the thread in an operating system (OS); detecting an OS flag, set by the OS, indicating that the OS is updating the shared library; in response to detecting the OS flag, suspending processing by the processing thread and transferring control from the thread to the OS; resuming processing by the processing thread in response to detecting that the OS has completed the updating; and executing the shared library in response to the resuming.

12 Claims, 5 Drawing Sheets

DYNAMIC LIBRARY REPLACEMENT

CROSS-REFERENCES TO RELATED APPLICATIONS

The present application is a continuation and claims the benefit of the filing date of an application entitled, "Dynamic Library Replacement" Ser. No. 13/844,673, filed Mar. 15, 2013, assigned to the assignee of the present application, and herein incorporated by reference.

FIELD OF DISCLOSURE

The claimed subject matter relates generally to computing systems and, more specifically, to techniques for the modification of shared libraries without shutting down associated programs.

BACKGROUND OF THE INVENTION

Most operating systems (OSs) provide for the implementation of shared libraries, which may also be known, among other names, as shared or dynamically-linked objects. In a typical OS, shared libraries in need of a repair, or patch, are fixed by replacing one version with another. However, programs that are currently running continue to use the original rather than the replacement, or new, version and only newly executed programs access the new version. This scenario implies that a running program must be restarted to take advantage of an OS modification and, if the running program is a system service that cannot be stopped and restarted, the entire computing system must be rebooted.

SUMMARY

Provided are techniques for an OS to be modified on a running system such that running programs, including system services, so not have to be stopped and restarted for the modification to take effect. The techniques include detecting, by a processing thread, when the processing thread has entered a shared library; in response to the detecting, setting a thread flag corresponding to the thread in an operating system (OS); detecting an OS flag, set by the OS, indicating that the OS is updating the shared library; in response to detecting the OS flag, suspending processing by the processing thread and transferring control from the thread to the OS; resuming processing by the processing thread in response to detecting that the OS has completed the updating; and executing the shared library in response to the resuming.

Also provided are techniques for setting, by an operating system (OS), an OS flag indicating that the OS is updating a shared library; detecting, by the OS, that a thread flag set in response to a processing thread detecting entry into the shared library, is set; detecting that the thread flag has been cleared; replacing the shared library with an replacement shared library in response to the detecting that the thread flag has been cleared; and clearing the OS flag in response to a completion of the replacing; detecting, by a processing, thread, when the processing thread has entered a shared library; in response to the detecting, setting a thread flag corresponding to the thread in an operating system (OS); detecting an OS flag, set by the OS, indicating that the OS is updating the shared library.

This summary is not intended as a comprehensive description of the claimed subject matter hut, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
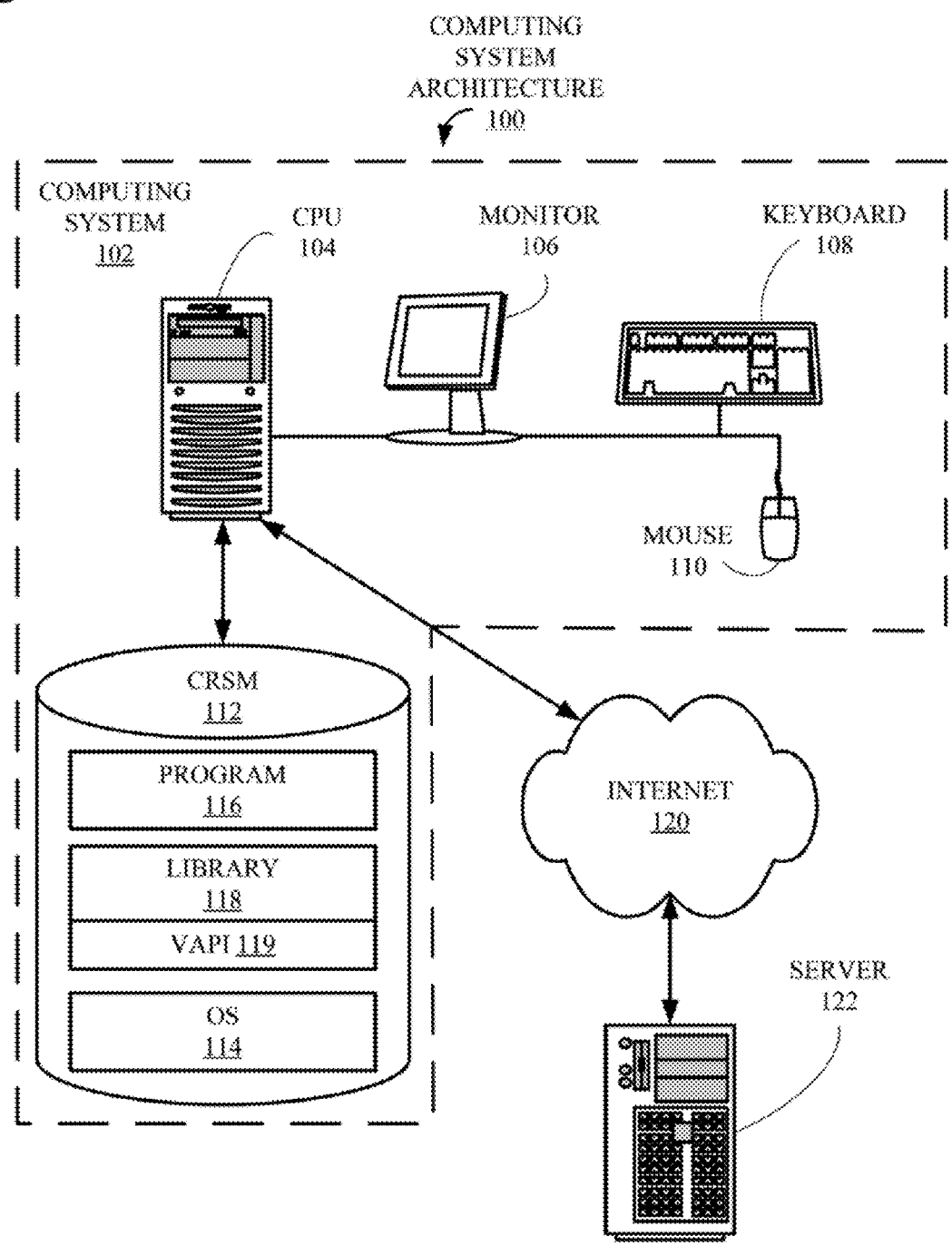
FIG. 1 is a block diagram of a computing system architecture that may implement the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the figures, FIG. 1 is a block diagram of a computing system architecture 100 that may implement the claimed subject matter. A computing system 102 includes a central processing unit (CPU) 104, coupled to a display 106, a keyboard 108 and a pointing device, or "mouse," 110, which together facilitate human interaction with elements of architecture 100 and computing system 102. Also included in computing system 102 and attached to CPU 104 is a computer-readable storage medium (CRSM) 112, which may either be incorporated into client system 102 i.e. an internal device, or attached externally to CPU 104 by means of various, commonly available connection devices such as but not limited to, a universal serial bus (USB) port (not shown). CRSM 112 is illustrated storing an operating system (OS) 114, which incorporates aspects of the claimed subject matter, and an example of logic associated with a computer software program, or simply "program," 116. Also stored on CRSM 112 is a shared computing library, or simply "library," 118, i.e., a collection of computing logic incorporated and employed by other programs such as program 116. Coupled to library 118 is a virtual application programming interface (VAPI) 119. In this example, library 118 and VAPI 119 is configured in accordance with the claimed subject matter. Components 114, 116, 118 and 119 and their relationship to the claimed subject matter are described in more detail below in conjunction with FIGS. 2-5.

Client system 102 and CPU 104 are connected to the Internet 120, which is also connected to a server computer 122. Although in this example, client system 102 and server 122 are communicatively coupled via the Internet 120, they could also be coupled through any number of communication mediums such as, but not limited to, a local area network (LAN) (not shown). Further, it should be noted there are many possible configurations of computing system architectures and computing systems that may implement the claimed subject matter, of which architecture 100 and computing system 102 are only simple examples.

Figure 2:
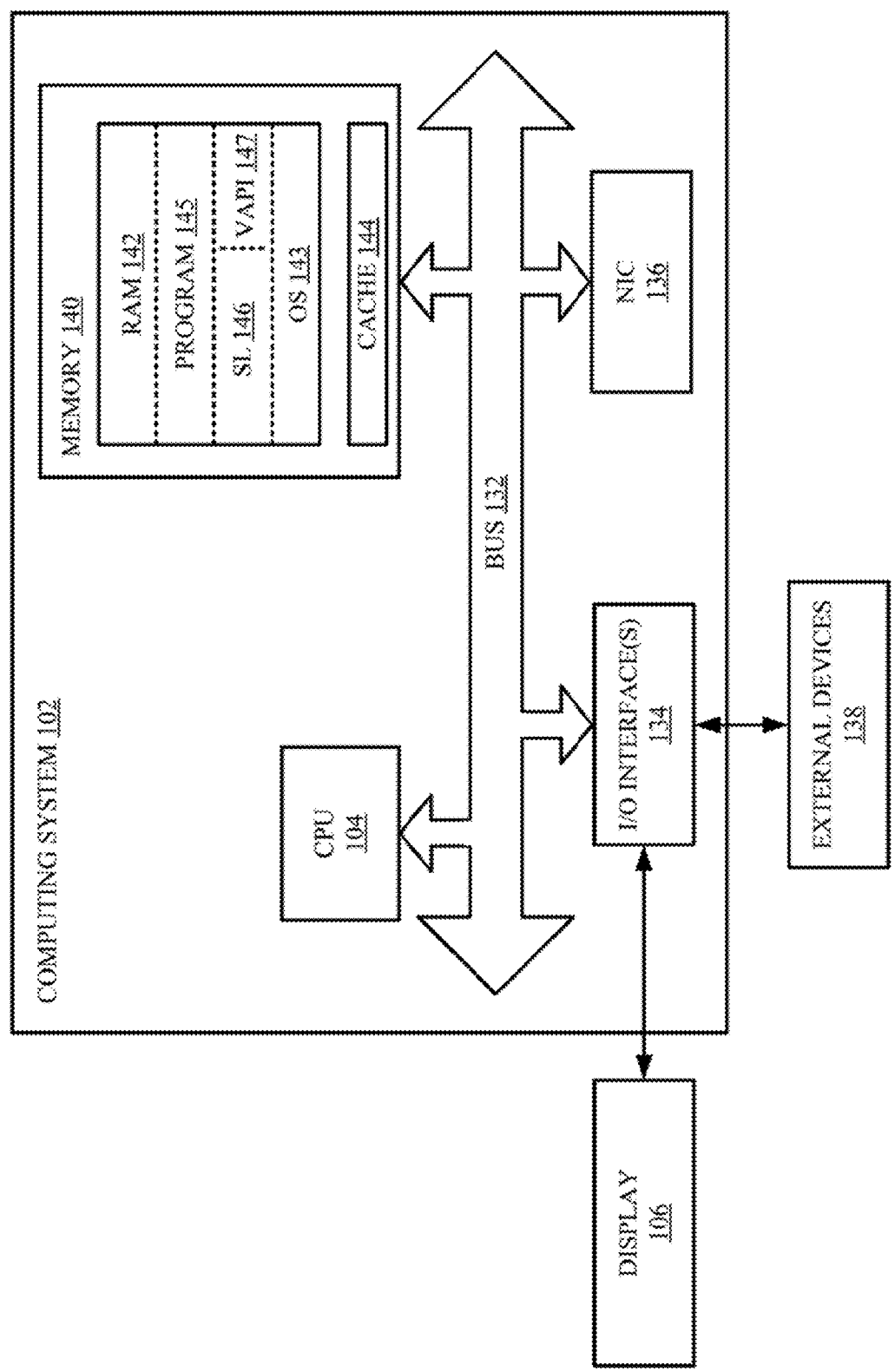
FIG. 2 is a block diagram of a computing system, first introduced in FIG. 1, in greater detail.

FIG. 2 is a block diagram of computing system 102, first introduced in FIG. 1, in greater detail. As shown in FIG. 1, computing system 102 is illustrated in the form of a general-purpose computing device. In this example, components of computing system 102 include, but are not limited to, CPU 104 (FIG. 1), which may include one or more processors (not shown), a system bus 132, which couples various components to CPU 104, including but not limited to, input/output (I/O) interfaces 134, a network interface card (NIC) 136 and memory 140. In this example, NIC 136 provides a communication path between computing system 102 and the Internet 120 (FIG. 1) also be provided to a LAN (not shown) or other network. I/O interfaces 134 enable various components (FIG. 1) to be coupled to computing system 102 such as display 106 (FIG. 1) and external devices 138. In this example, external devices 118 include keyboard 108 (FIG. 1) and mouse 110 (FIG. 1).

Bus 132 represents one or more of any of several types of bus structures, which for the sake of simplicity are not shown, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced. ISA (EISA) bus, Video Electronics Standards Association (VESA) local bus, and Peripheral Component interconnects (PCI) bus.

Memory 140 typically includes a variety of computer system readable media. Such media may be any available media that is accessible by computer system/server 102 and includes both volatile and non-volatile media. In this example, memory 140 includes random access memory (RAM) 142 and cache memory, or simply "cache," 144. Computing system/102 and memory 140 may also further include other removable/non-removable, volatile/non-volatile computer system storage media. Memory 140 is also illustrated storing an operating system (OS) 143, a program 145 and a shared library (SL) 146, which includes a virtual application programming interface (VAPI) 147. In the following examples, OS 143, program 145 SL 146 and VAPI 147 are copies of OS 114 (FIG. 1), program 116 (FIG. 1), library 118 (FIG. 1) and VAPI 119 (FIG. 1) that are loaded into RAM 142. SL 146 is modified in accordance with the claimed, subject matter by employing features incorporated into VAPI 147. VAPI 147 and modification of SL 146 are explained in more detail below in conjunction with FIGS. 3-5.

Figure 3:
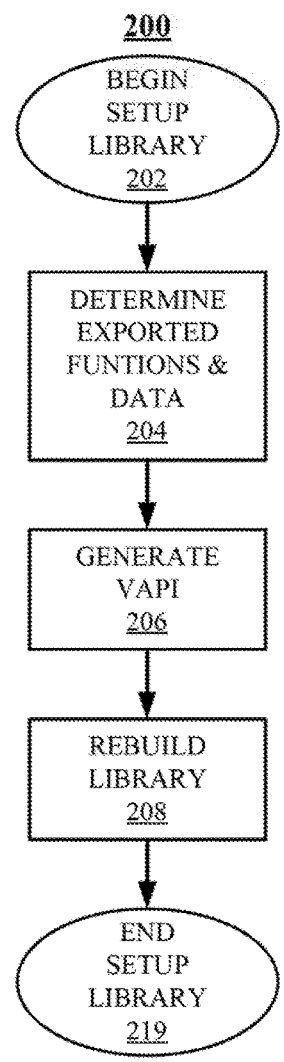
FIG. 3 is a flowchart of a "Setup Library" process that may implement aspect of the claimed subject matter.

FIG. 3 is a flowchart of a "Setup Library" process 200 that may implement aspect of the claimed subject matter. Typically, process 200 would be implemented by a programmer or administrator that modified a typical library to function in accordance with the claimed subject matter. Process 200 starts is at "Begin Setup Library" block 202 and proceeds immediately to a "Determine Exported Functions and Data" block 204. During processing associated with block 204, library 118 (FIG. 1) is examined to identify any functions and data that may be exported to programs such as program 116 (FIG. 1). In other words, symbols associated with any non-private interfaces and data of library 118 that may be used directly by a program are identified. Typically, these identified symbols are positioned at fixed address relative to library 118. In addition, a library routine may pass data items back to a program, or "application." During processing associated with a "Generate Virtual Application Programming Interface (VAPI)" block 206, the fixed address of symbols in library 118 are replaced by representations in VAPI 119 (FIG. 1). In other words, VAPI 119 represents the exported and exposed portions of library 118 to programs such as program 116.

During processing associated with a "Rebuild Library" block 208, library 118, with VAPI 119 are recompiled, or "rebuilt," and stored on CRSM 112 (FIG. 1) for use by a program such as program 118. Finally, control process to an "End Setup Library" block 219 in which process 200 is complete.

Figure 4:
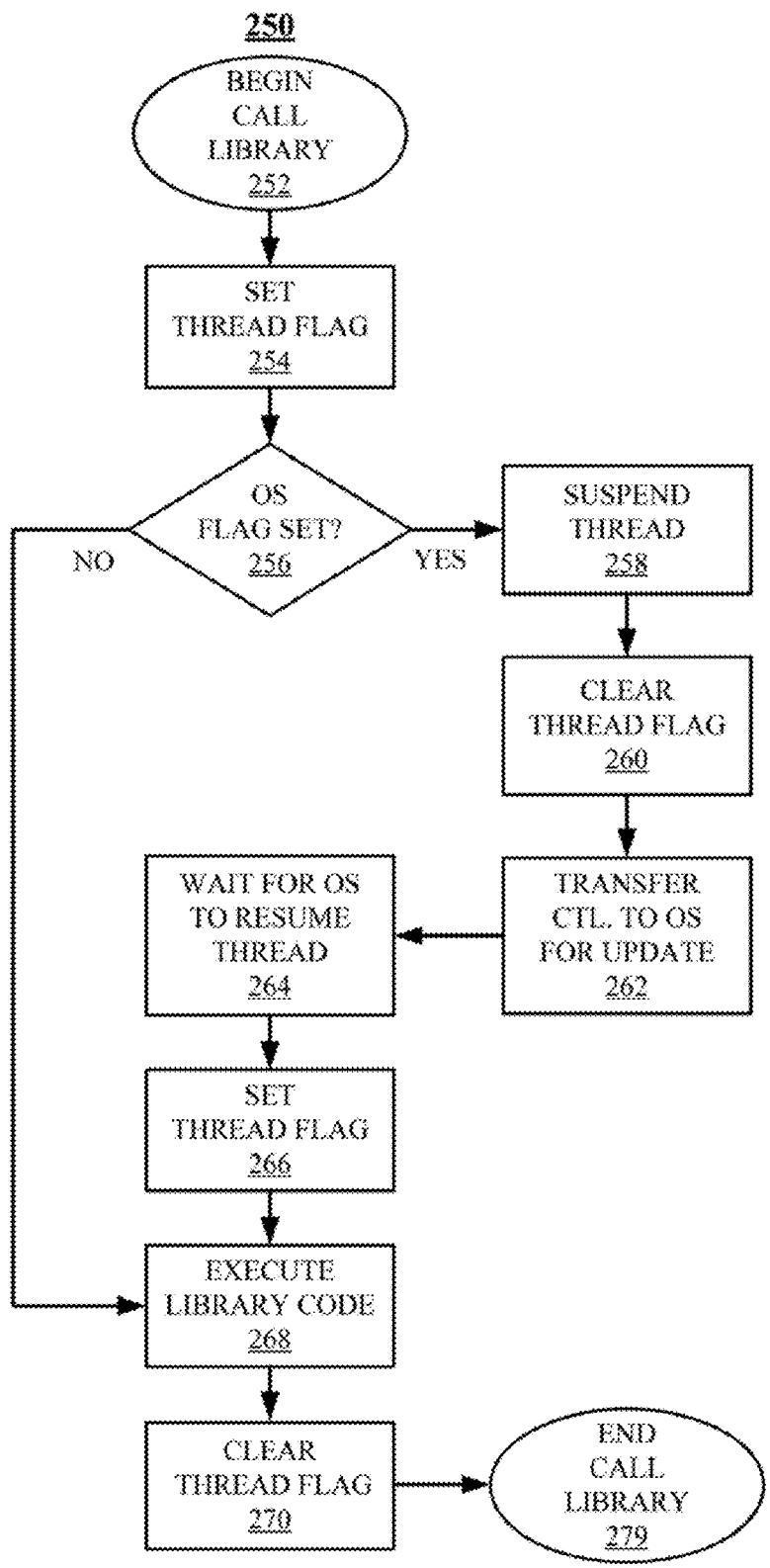
FIG. 4 is a flowchart of a "Call Library" process that may implement aspect of the claimed subject matter.

FIG. 4 is a flowchart of a "Call Library" process 250 that may implement aspect of the claimed subject matter. In this example, process 250 is associated with logic of library 146 (FIG. 2) that is executed on CPU 104 (FIGS. 1 and 2) in conjunction with program 145 (FIG. 2). Process 250 starts in a "Begin Call Library" block 252 when library 146 is called by program 145 and proceeds immediately to a "Set Thread Flag" block 254. As explained above in conjunction with FIG. 2, library 146 is configured in accordance with the claimed subject matter such that program 145 calls interfaces in VAPI 147 (FIG. 2) rather than interfaces in library 146.

During processing associated with block 254, a flag (not shown) associated with library 146 is set to indicate that program 146 is about to execute code, or "enter," library 146. During processing associated with an "operating System (OS) Flag Set" block 254, a determination is made as to whether or not a particular flag (not shown) associated with OS 143 (FIG. 2) is set (see 304, FIG. 5). This "OS flag" is set by OS 143 when a request to update library 146 has been received by OS 143. If the OS flag is set, control proceeds to a "Suspend Thread" block 258. During processing associated with block 258, a thread of program 145 that is responsible for the call to library 146 that initiated process 250 is suspended. In conjunction with the suspension, a processing table (not shown) of OS 143 is updated to reflect the suspension.

During processing associated with a "Clear Thread Flag" block 260, a flag in OS 146 that corresponds to the calling thread is cleared, indicating to OS 143 that the thread is not active, i.e., either not in the process of being called or suspended. During processing associated with a "Transfer Control to OS for Update" block 262, control is returned to OS 143 so that library 146 can be updated. During processing associated with a. "Wait for OS to Resume Thread" 264, the thread that called library 143 waits until OS 143 indicates that a resumption of processing is allowed, typically by changing an entry in the processing table from suspended to active.

During processing associated with a "Set Thread Flag" block 266, the thread in OS 143 is set to indicate to OS 143 that the thread is now active. Once the thread flag has been set during processing associated with block 266 or, if during processing associated with block 256, a determination was made that the OS flag was not set, control proceeds to an "Execute Library Code" block 268. During processing associated block 268, the logic associated with library 143 that was called by program 145 is executed.

During processing associated with a "Clear Thread Flag" block 290, the thread flag is cleared. Finally, control proceeds to an "End Call Library" block 279 during which process 250 is complete.

Figure 5:
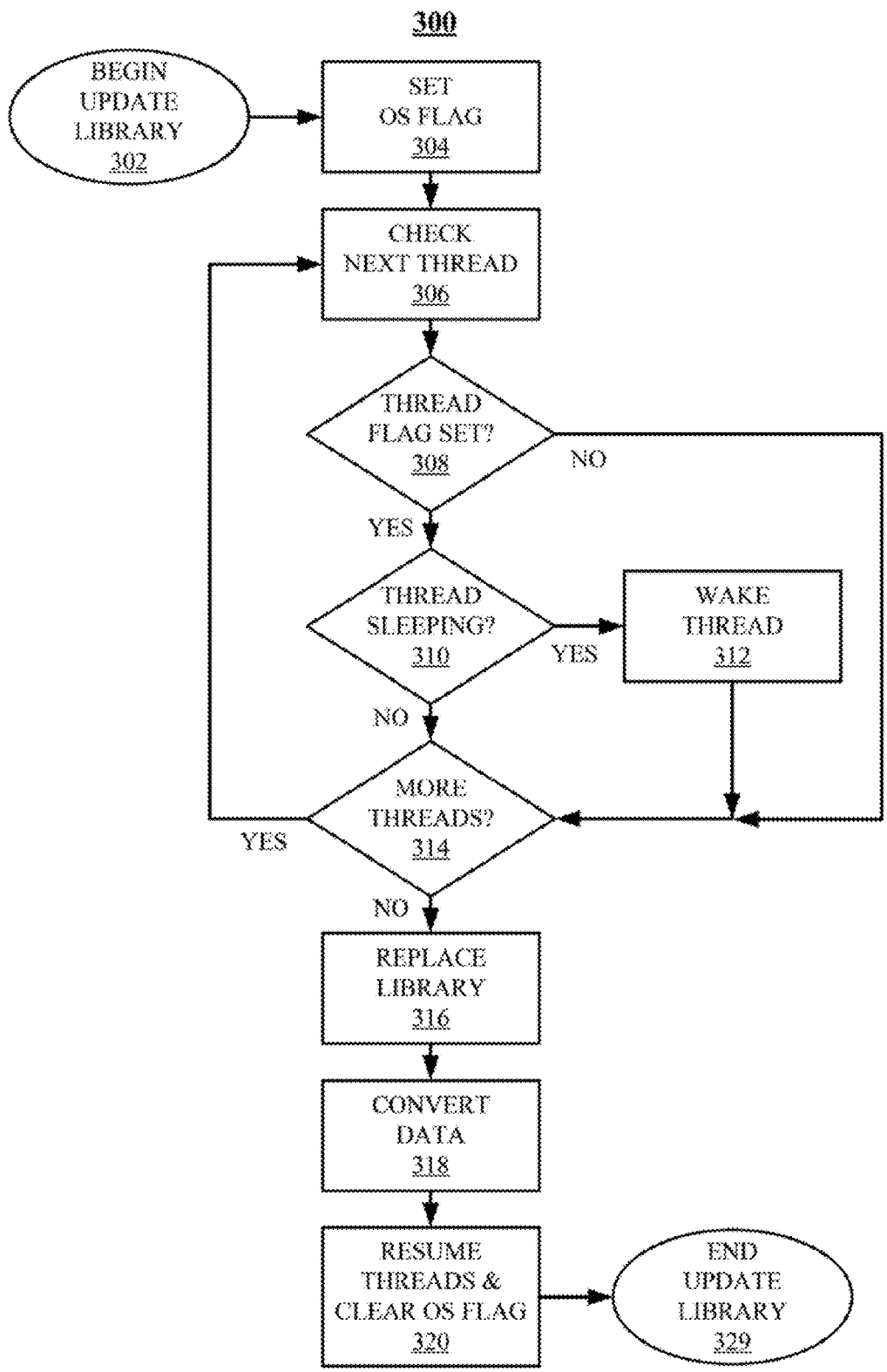
FIG. 5 is a flowchart of an "Update Library" process that may implement aspect of the claimed subject matter.

FIG. 5 is a flowchart of an "Update Library" process 300 that may implement aspect of the claimed subject matter. In this example, process 300 is associated with logic incorporated into OS 114 (FIG. 1) and executed on one or more processors (not shown) of CPU 104 (FIGS. 1 and 2) to update shared library 146 (FIG. 2). In an alternative embodiment, process 300 may be incorporated into a stand-alone library update utility.

Process 300 starts in a "Begin Update Library" block 302 and proceeds immediately to a "Set OS Flag" block 304. During processing associated with block 304, a flag (not shown) in OS 114 is set to indicate, that OS 114 is beginning the process of updating a library. During processing associated with a "Check Next Thread" block 306, a first thread of a set of threads corresponding to a particular process (see 254, 260, 266 and 270, FIG. 4) of a set of process threads corresponding to the library being updated, e.g. SL 146, is checked. As explained above in conjunction with FIG. 4, each processing thread currently executing has a corresponding flag in OS 114 that indicates the particular thread is entering a library such as library 146. Although described with respect to one program and one library, the claimed subject matter is equally applicable to scenarios with multiple programs and multiple libraries. In that ease, each thread of each process would have a flag for each library that may be called by the particular thread and only those threads corresponding to a library that is to be updated would be checked.

During processing associated with a "Thread Sleeping" block 310, a determination is made as to whether or not the thread being checked during processing associated with 306 is currently paused. A thread may be paused for reasons such as, but not limited to waiting for a system call to return, if a determination is made that the thread is sleeping, control proceeds to a "Wake Thread" block 312. During processing associated with block 312, the sleeping thread is awaken so that the thread may resume processing, eventually to complete the library call that is currently executing. Once the thread is awaken or a determination is made that the thread is not sleeping, control proceeds to a "More Threads?" block 314. During processing associated with block 314, as determination is made as to whether or not there are threads that still need to be checked to see if they are executing in SL 146. If so, control returns to block 306, the next flag corresponding to the next thread is checked and processing continues as described above. In short, process 300 continues to check the thread flags until none are set by looping through blocks 306, 308, 310, 312 and 314 and all the thread flags associated with the library to be updated. As explained above in conjunction with FIG. 4, once a thread has completed library code, the corresponding thread flag is cleared and the OS flag set during processing associated with 304 prevents the thread from reentering the library.

During processing associated with an "Update Library" block 316, SL 146 is updated. During processing associated with a "Convert Data" block 318, any modified data or data structures associated with SL 146 are updated. During processing associated with a "Resume Threads and Clear OS Flag" block 320, the OS flag set during processing associated with 304 is cleared and all the threads associated with SL 146 are resumed by updating the corresponding entries in the processing table. Finally, control proceeds to an "End Update Library" block 329 in which process 300 is complete.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block, diagrams and/or flowchart illustration, can be implemented by special purpose hardware-based systems that perform the specified functions or acts, or combinations of special purpose hardware and computer instructions.

We claim:

1. An apparatus, comprising:
   a processor;
   a non-transitory, computer-readable storage medium coupled to the processor; and
   logic, stored on the computer-readable storage medium and executed on the processor, for:
      detecting, by a processing thread, when the processing thread has entered a shared library;
      setting, in an operating system (OS) and in response to the detecting, a thread flag corresponding to the thread;
      detecting an OS flag, set by the OS, indicating that the OS is updating the shared library;
      in response to detecting the OS flag, suspending updating of the shared library and transferring control from the OS to the thread;
      detecting that the thread has cleared the thread flag and that the thread is sleeping;
      and
      resuming the updating of the shared library and waking the thread in response to detecting the thread flag has been cleared and the thread is sleeping.

2. The apparatus of claim 1, the logic further comprising logic for clearing the thread flag in response to the suspending processing by the processing thread.

3. The apparatus of claim 2, the logic further comprising logic for setting the thread flag in response to the initiation of processing by the processing thread.

4. The apparatus of claim 1, the logic further comprising logic for, in response to waking the thread, executing by the processing thread in the shared library.

5. The apparatus of claim 1, the logic further comprising logic for clearing the thread flag upon completion of the executing by the thread of the shared library.

6. The apparatus of claim 5, the logic further comprising logic for clearing the OS flag upon completion of the updating of the shared library.

7. A computer programming product, comprising:
   a non-transitory, computer-readable storage medium; and
   logic, stored on the computer-readable storage medium for execution on a processor, for:
      detecting, by a processing thread, when the processing thread has entered a shared library;
      setting, in an operating system (OS) and in response to the detecting, a thread flag corresponding to the thread;
      detecting an OS flag, set by the OS, indicating that the OS is updating the shared library;
      in response to detecting the thread flag, suspending updating of the shared library and transferring control from the OS to the thread;
      detecting that the thread has cleared the thread flag and that the thread is sleeping;
      and
      resuming the updating of the shared library and waking the thread in response to detecting the thread flag has been cleared and the thread is sleeping.

8. The computer programming product of claim 7, the logic further comprising logic for clearing the thread flag in response to a completion of processing by the processing thread.

9. The computer programming product of claim 8, the logic further comprising logic for setting the thread flag in response to the initiation of processing by the processing thread.

10. The computer programming product of claim 7, the logic further comprising logic for, in response to waking the thread, executing by the processing thread in the shared library.

11. The computer programming product of claim 7, the logic further comprising logic for clearing the thread flag upon completion of the executing by the thread of the shared library.

12. The computer programming product of claim 11, the logic further comprising logic for clearing the OS flag upon completion of the updating of the shared library.

\* \* \* \* \*